(Model.)

2 Sheets—Sheet 1.

E. PAYNE.
MACHINE FOR REMOVING SPROUTS FROM POTATOES.

No. 260,407. Patented July 4, 1882.

Attest:
Herm. Lauten.
Wm. C. Henderson.

Inventor:
Edwin Payne.
By H. J. Abbot,
Attorney.

(Model.)

E. PAYNE.
MACHINE FOR REMOVING SPROUTS FROM POTATOES.

No. 260,407. Patented July 4, 1882.

Attest:
Herm. Lauten
Wm. G. Henderson

Inventor:
Edwin Payne
By H. J. Abbot
Attorney.

UNITED STATES PATENT OFFICE.

EDWIN PAYNE, OF OXBOW, NEW YORK.

MACHINE FOR REMOVING SPROUTS FROM POTATOES.

SPECIFICATION forming part of Letters Patent No. 260,407, dated July 4, 1882.

Application filed June 11, 1881. (Model.)

*To all whom it may concern:*

Be it known that I, EDWIN PAYNE, a citizen of the United States, residing at Oxbow, in the county of Jefferson and State of New York, have invented certain new and useful Improvements in Machines for Removing Sprouts from Potatoes; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification, and in which—

Figure 1:
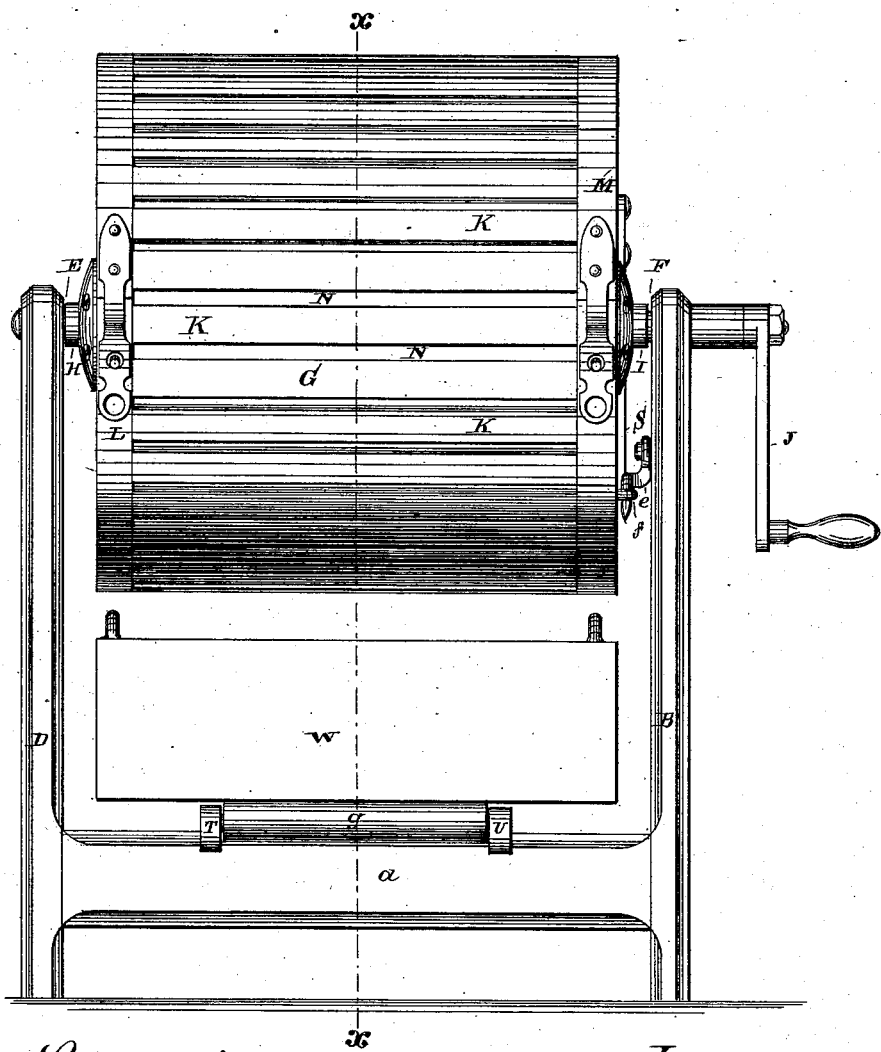
Figure 2:
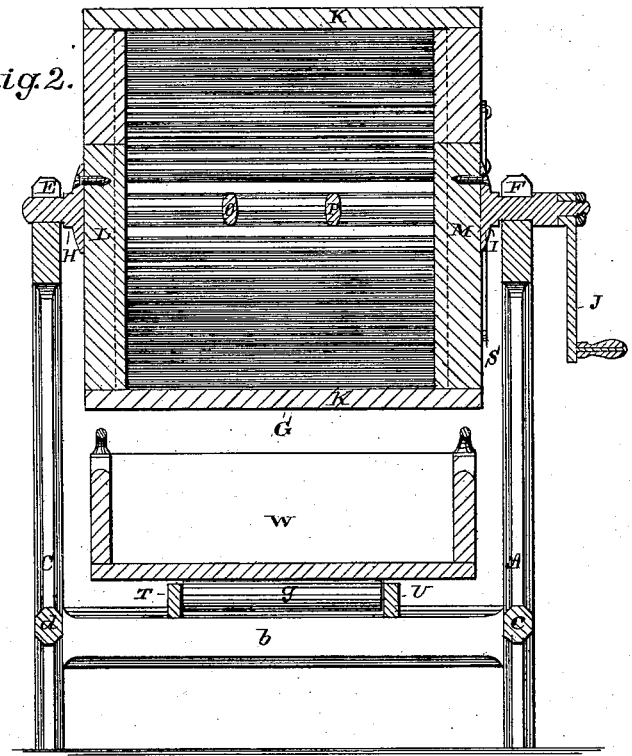
Figure 3:
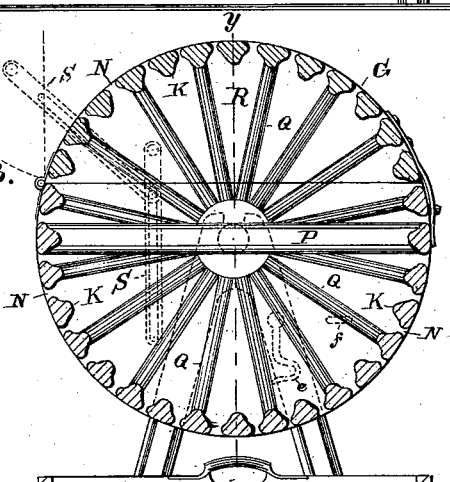

Figure 1 is a side elevation. Fig. 2 is a vertical longitudinal section, and Fig. 3 is a vertical cross-section.

My invention has for its object the removal of sprouts from potatoes; and it consists in the construction and operation of parts, as will be hereinafter more fully set forth and claimed.

The standards A B and C D, united at the top to form the bearings E and F, and the brace-bars $a$, $b$, $c$, and $d$, constitute the frame for supporting the cylinder G. This cylinder is provided with gudgeons H and I on either end, that are seated in the bearings E and F, and permit of a free revolution of the cylinder, except when it is held by a hook, $e$, secured to the frame, and an eye, $f$, secured to the head of the cylinder. One of the gudgeons is provided with a crank, J, by which the cylinder may be revolved at will. The gudgeons are secured to the heads of the cylinder by any suitable means, and may be of any suitable form of construction.

The cylinder G may be of any suitable material and substantially of the form shown in the accompanying drawings, being made preferably of wood, and consisting of slats K let into or otherwise suitably secured to the heads L and M, about three-fourths of an inch apart, the outsides of the slats being plainly finished.

The insides of the slats are provided with ogee sides. This construction produces expanding grooves N, having open bottoms, through which the sprouts are thrown after being rubbed off by the ribs or edges of the slats.

Two bars, O and P, extend across the center of the cylinder, between two of the slats K, each of the bars being about one-third of the length of the cylinder from one of the heads. The edges of the bars are rounded off sufficiently to prevent the bruising of the potatoes as they pass. It will be observed that these bars separate the cylinder into three parts, as shown in Fig. 2 of the drawings, through which the potatoes must pass twice for every revolution of the cylinder.

The inside parts of the heads L and M are provided with a series of ribs or beads, Q, radiating from the center to and adjoining alternate slats K. These ribs or beads are of any suitable height, and are oval, so as to rub off the sprouts without damaging the potatoes.

A segment of the cylinder, constituting about one-third of its diameter, is cut off and hinged to form a door, R, for the cylinder. Strap-hinges secured to the edges of the heads are used, and the fastening may be a spring-strap and a stud, as shown in the drawings, or a hook and eye on the side, such as is shown, and used to hold the cylinder stationary for filling. A slotted strap, S, is used to limit the movement of the door. This strap may be made of light cast-iron, or of any other suitable material, and is secured to the door by means of a screw passing through a drilled hole near its end, through a washer, and into the door, holding a strap to the washer, and to the cylinder by a screw passing through the slot and a washer into the end of the cylinder, allowing the strap to slide between the head of the screw and the washer.

Across the brace-bars two bars, T and U, are secured, holding between them a series of rollers, $g$, on which a box or tray, W, of any suitable construction, is placed to receive the potatoes from the cylinder after they have been sprouted.

The operation of my potato-sprouter is as follows: The tray W being withdrawn and the door open, I partially fill the cylinder with potatoes, shut the door and give the cylinder several revolutions at a slow rate of speed— say at about the rate a grindstone should be turned—which will permit the potatoes to roll and rub against the slats, bars, ribs, and against each other until the sprouts are removed and the potatoes are cleaned of all dirt. The tray is then set under the cylinder, the door raised, and the cylinder turned over and emptied into the tray.

Having thus described my invention, I claim as new and desire to secure by Letters Patent—

1. A potato-sprouter composed essentially of a revolving cylinder provided with ogee-formed slats, cross-bars, and ribbed heads, substantially as shown and described.

2. The combination, with a frame, of the revolving sprouting-cylinder described, provided with a segmental door and a tray, substantially as shown and described.

In testimony whereof I affix my signature in presence of two witnesses.

EDWIN PAYNE.

Witnesses:
WM. G. HENDERSON,
HERM. LAUTEN.